US 9,908,782 B2

(12) United States Patent
Pavlacka et al.

(10) Patent No.: US 9,908,782 B2
(45) Date of Patent: Mar. 6, 2018

(54) METHOD FOR SYNTHESIS OF BORON SUBOXIDE

(71) Applicant: U.S. Army Research Laboratory, Washington, DC (US)

(72) Inventors: Robert J. Pavlacka, Baltimore, MD (US); Gary A. Gilde, North East, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 251 days.

(21) Appl. No.: 13/767,358

(22) Filed: Feb. 14, 2013

(65) Prior Publication Data

US 2014/0227158 A1  Aug. 14, 2014

(51) Int. Cl.
*C01B 35/10* (2006.01)

(52) U.S. Cl.
CPC .................. *C01B 35/1027* (2013.01)

(58) Field of Classification Search
CPC ................ C01B 35/10; C01B 35/1027; C04B 2235/3409
USPC .................................. 423/277, 278
See application file for complete search history.

(56) References Cited

U.S. PATENT DOCUMENTS

| 3,660,031 A | 5/1972 | Holcombe, Jr. et al. |
| 3,816,586 A | 6/1974 | Goosey |
| 5,135,892 A | 8/1992 | Ellison-Hayashi et al. |
| 5,330,937 A | 7/1994 | Ellison-Hayashi et al. |

FOREIGN PATENT DOCUMENTS

JP    2004075467 A  *  3/2004

OTHER PUBLICATIONS

Grabis et al, "Preparation of boron suboxide nanoparticles and their processing" IOP Conf. Series: Materials Science and Engineering 25 (2011), pp. 1-5.*
Pavlaka et al, "Low Temperature Densification and Mechanical Properties of Ultra-Hard Boron Suboxide Ceramics," Abstract from MS&T'11, available at http://www.programmaster.org/PM/PM.nsf/ApprovedAbstracts/0304042C65F2DC988525789E005FF926?OpenDocument.*
"Innovative Processing and Synthesis of Ceramics, Glasses and Composites: Processing and Microstructure-Property Relationships" Oct. 19, 2011 presentation lineup, available at http://www.programmaster.org/PM/PM.nsf/ViewSessionSheets?OpenAgent&ParentUNID=182245ED15B3CED48525787E000B15F1.*
Akashi et al, "thermoelectric properties of hot-pressed boron suboxide (B6O)," Materials Transactions, vol. 43, No. 7 (2002) pp. 1719-1723.*
T. Akashi, et al., Thermoelectric Properties of Hot-pressed Boron Suboxide (B6O), Mater Trans, vol. 43, No. 7, pp. 1719-1723, 2002.

* cited by examiner

*Primary Examiner* — Anthony J Zimmer
(74) *Attorney, Agent, or Firm* — Christos S. Kyriakou

(57) ABSTRACT

Methods of preparing boron suboxide are provided herein. In some embodiments, a method for preparing boron suboxide may include loading elemental boron powder into a furnace; purging the furnace by flowing a first gas comprising one of nitrogen or an inert gas into the furnace; heating the boron powder in a reactive atmosphere comprising a mixture of argon and a non-reducing oxygen-containing gas to convert elemental boron powder into boron suboxide powder, wherein the amount of oxygen in the reactive atmosphere is no greater than about 1%.

20 Claims, 2 Drawing Sheets

METHOD FOR SYNTHESIS OF BORON SUBOXIDE

GOVERNMENT INTEREST

Governmental Interest—The invention described herein may be manufactured, used and licensed by or for the U.S. Government.

FIELD OF INVENTION

Embodiments of the present invention generally relate to boron suboxide and, more particularly, to methods of synthesizing boron suboxide.

BACKGROUND OF THE INVENTION

Boron suboxide, with a stoichiometry designated as $B_6O_x$ ($0.75<x>1$) is a chemically inert, super hard material (defined as $H_v>40$ GPa), with a relatively low mass density (2.6 g/cc) that is used as an abrasive grit for polishing and grinding metals and in the formation of dense ceramic materials used in armor systems and cutting tools. A super hard material may be defined as a material having a Vickers hardness ($H_v$) greater than 40 GPa as measured by ASTM 384-11e1 Standard Test for Knoop and Vickers Hardness of Materials. One typical method of synthesizing boron suboxide is to mix elemental boron with an oxygen-containing boron compound, such as boron trioxide ($B_2O_3$) and heat treat the mixture in an inert gas atmosphere. The resulting reaction forms a boron suboxide powder in particulate form that must undergo further processing, such as a milling process, prior to ceramic processing.

A second typical boron suboxide synthesis method utilizes the reduction of a metal oxide, such as zinc oxide (ZnO), to deliver the oxygen necessary for boron suboxide synthesis. Elemental boron is mixed with the metal oxide and heat treated to approximately 1300 degrees Celsius to 1500 degrees Celsius in an inert gas atmosphere to yield a boron suboxide powder. However, the resulting boron suboxide powder must undergo further processing, such as acid leaching, to remove remnant metal impurity from the boron suboxide powder.

Therefore, the inventors have provided improved methods of preparing boron suboxide.

BRIEF SUMMARY OF THE INVENTION

Embodiments of the present invention relate to methods of preparing an electrically conductive ceramic material. In some embodiments, a method of forming boron suboxide may include loading elemental boron powder into a furnace; purging the furnace by flowing a first gas comprising one of nitrogen or an another inert gas into the furnace; heating the boron powder in a reactive atmosphere comprising a mixture of argon and a non-reducing oxygen-containing gas to convert elemental boron powder into boron suboxide powder, wherein the amount of oxygen in the reactive atmosphere is no greater than about 1%.

In some embodiments, a method of preparing a boron suboxide powder may include loading elemental boron powder into a furnace; purging the furnace by flowing one of nitrogen or an inert gas into the furnace; heating the boron powder to a temperature of about 1200 degrees Celsius to about 1500 degrees Celsius and at a pressure of about atmospheric pressure in a reactive atmosphere comprising a mixture of argon and water vapor to convert elemental boron powder into boron suboxide powder, wherein the amount of oxygen in the reactive atmosphere is no greater than about 1%; agitating the boron powder within the furnace; and removing the boron suboxide powder from the furnace Other and further embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Embodiments of the present invention include methods of preparing boron suboxide. The methods of preparing boron suboxide in accordance with embodiments of the present invention may advantageously convert elemental boron powder into an un-aggregated boron suboxide powder that is almost identical in size to the elemental boron powder, and therefore, requires no milling prior to ceramic processing. The methods of preparing boron suboxide in accordance with embodiments of the present invention may also advantageously eliminate the need to remove metal contaminants from the synthesized boron suboxide powder.

Figure 1:
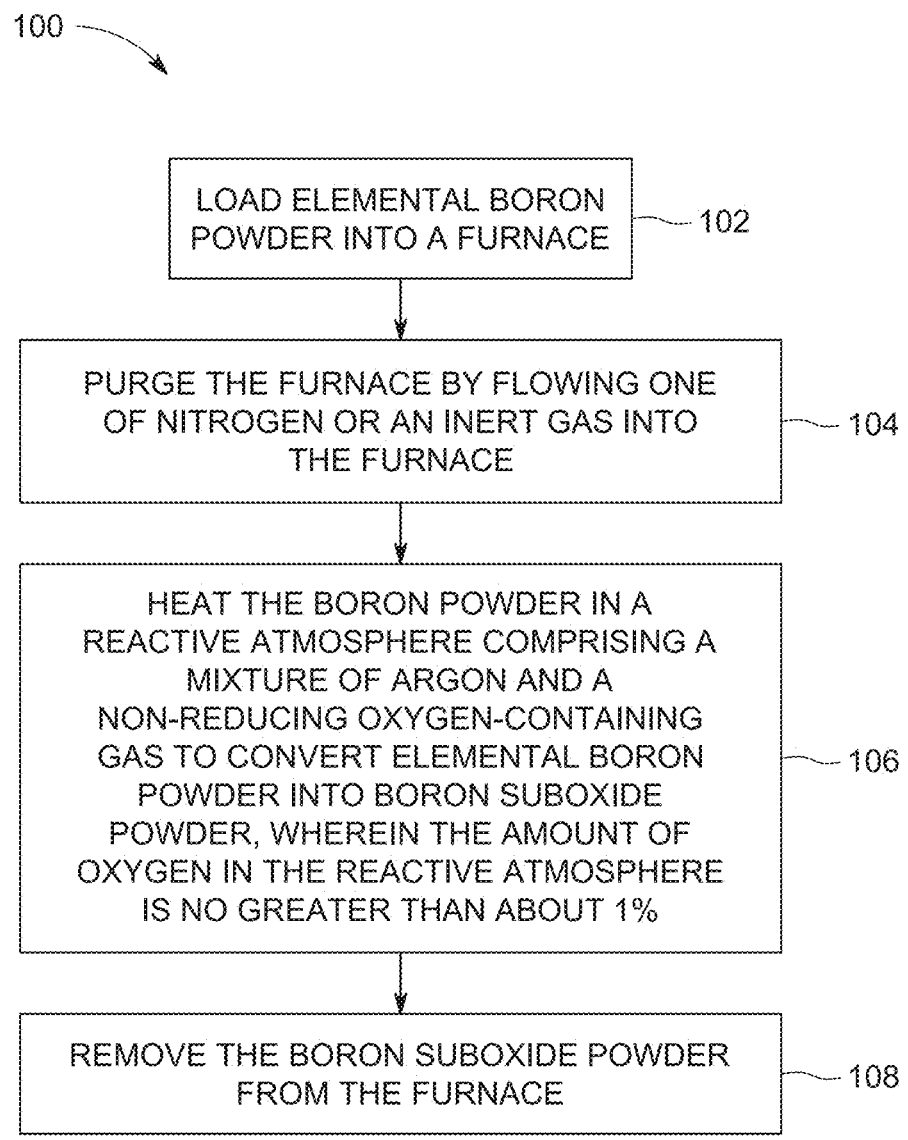
FIG. 1 depicts a flow diagram of a method of forming boron suboxide in accordance with some embodiments of the present invention.

FIG. 1 depicts a flow diagram of a method 100 of preparing boron suboxide in accordance with some embodiments of the present invention. The method of preparing a boron suboxide powder 100 starts at 102 by loading elemental boron powder into a furnace. In some embodiments, the elemental boron powder has a purity of at least 92%, for example boron having a purity of at least about 92 percent as defined by military specification MIL-B-51092. In some embodiments, the elemental boron powder has a purity of at least 95%. In some embodiments, the elemental boron powder has a purity of from about 92% to about 95%. In some embodiments, the elemental boron powder comprises at least one of crystalline boron, amorphous boron, boron trifluoride, or boron trichloride. The use of only one powder, elemental boron powder, advantageously simplifies the boron suboxide powder production process.

Next, at 104, the furnace is purged by flowing one of nitrogen or another inert gas, such as argon or helium, or any mixture thereof into the furnace to ensure the complete removal of oxygen from within the furnace. Other suggested inert gasses include, but are not limited to, neon, krypton, xenon and radon. Where nitrogen is used to purge oxygen from the furnace, the furnace should then purged with another inert gas to remove nitrogen from the furnace.

Next, at 106, the boron powder is heated in a reactive atmosphere comprising a mixture of argon and a non-reducing oxygen containing gas, wherein the amount of oxygen in the reactive atmosphere is no greater than about 1%. A non-reducing oxygen containing gas is defined as an oxygen containing gas that allows for the oxidation of the boron powder to occur. Examples of suitable non-reducing oxygen containing gas include, but are not limited to, pure oxygen ($O_2$), water vapor, ozone ($O_3$), hydrogen peroxide ($H_2O_2$) vapor, and alcohol vapor, or the like.

The amount of oxygen in the reactive atmosphere advantageously coverts the elemental boron powder to boron suboxide while limiting the formation of undesired byproducts, such as boron trioxide or boric acid. Specifically, the amount of oxygen in the reactive atmosphere converts about 50% to about 80% of the boron powder into boron suboxide powder and about 50% to about 20% of the boron powder into at least one of boron trioxide or boric acid. In some embodiments, all, or substantially all, of the boron powder can be converted into boron suboxide powder by agitating the boron powder to prevent the formation of undesired byproducts along the surface of the boron powder. In some embodiments, the boron powder can be agitated within the furnace by any suitable means, for example, by placing the boron powder atop a suitable vibrating support surface within the furnace.

In some embodiments, the elemental boron powder is heated while flowing a first gas into the furnace to create the reactive atmosphere. In some embodiments, the elemental boron powder is heated to a temperature of about 1200 to about 1500 degrees Celsius while flowing the first gas into the furnace to create the reactive atmosphere. In some embodiments, the boron powder is heated to a temperature of about 1200 degrees Celsius to about 1500 degrees Celsius for up to about 5 hours while flowing the first gas into the furnace to create the reactive atmosphere. In some embodiments, the boron powder is heated to a temperature of 1400 degrees Celsius for about 1 hour in the reactive atmosphere in order to synthesize boron suboxide powder. In some embodiments, as the temperature is ramped up to about 1200 degrees to about 1500 degrees Celsius, the atmosphere within the furnace can be an inert atmosphere. In some embodiments, following the synthesis of boron suboxide powder, the reactive atmosphere in the furnace can be purged and replaced with an inert atmosphere during the ramping down of the temperature within the furnace. In some embodiments, the pressure within the furnace during heating is about atmospheric pressure.

In some embodiments, the first gas, and the reactive atmosphere, comprises a mixture of argon and oxygen gas ($O_2$). Preferably, the amount of oxygen in the argon-oxygen gas mixture is no more than about 1%.

In some embodiments, the first gas, and the reactive atmosphere, is a mixture of argon and water vapor. In some embodiments, the mixture is formed by bubbling argon through water vapor, referred to herein as "wet argon". The amount of oxygen in the argon-water vapor mixture is no more than about 1%.

Next, at 108, the heated boron suboxide powder is removed from the furnace. In some embodiments, where the reactive atmosphere is wet argon, the boron suboxide powder is removed from the furnace, washed in hot deionized water, and filtered to remove byproducts, such as boron trioxide or boron hydroxide, that may form as a crust on the surface of the boron suboxide powder.

Figure 2A:
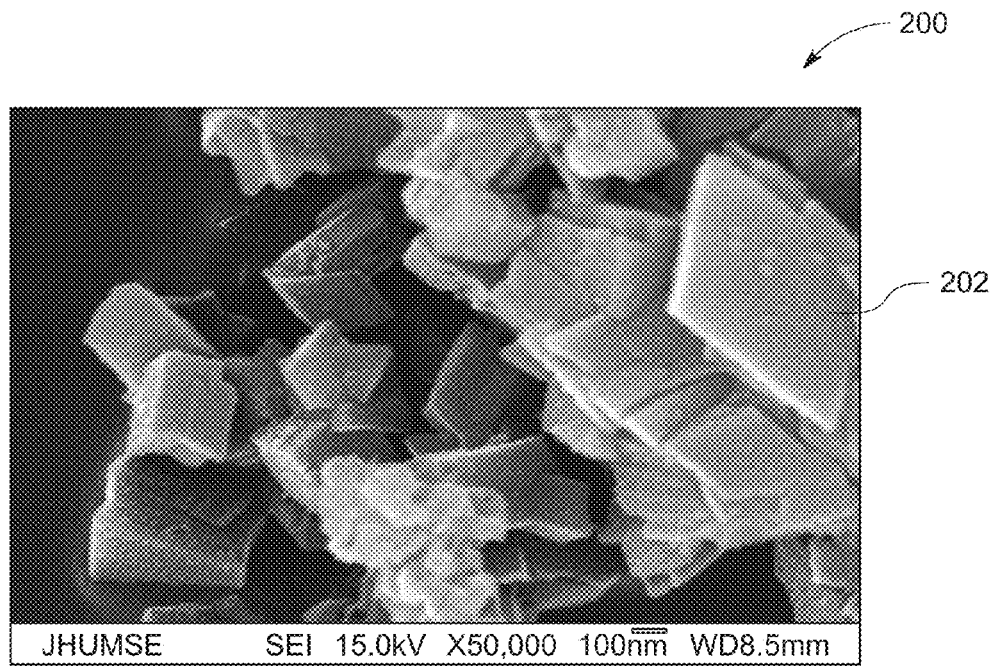
FIG. 2A depicts a scanning electron microscope image of a boron suboxide powder in accordance with some embodiments of the present invention.
Figure 2B:
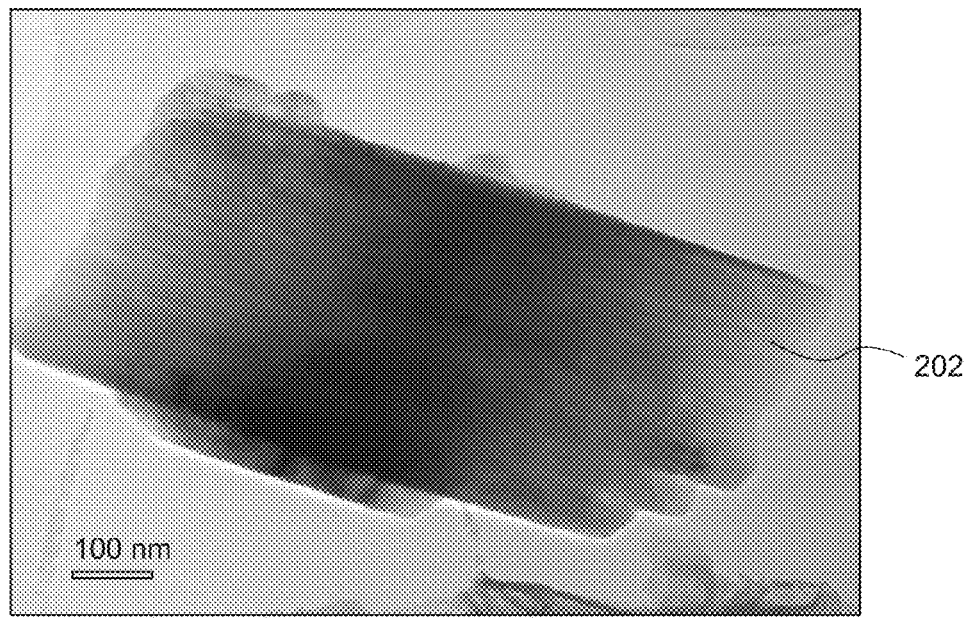
FIG. 2B depicts a transmission electron microscope image of a boron suboxide powder particle in accordance with some embodiments of the present invention.

FIG. 2A depicts a scanning electron microscope (SEM) micrograph of boron suboxide powder 200 in accordance with some embodiments of the present invention. FIG. 2B depicts a transmission electron microscope (TEM) micrograph of a boron suboxide powder particle 202 in accordance with some embodiments of the present invention. The particle size of the boron suboxide powder 200 removed from the furnace is substantially equal to the particle size of the elemental boron powder loaded into the furnace. In some embodiments, the particle size of the boron suboxide powder is about 0.2 micron to about 1 micron. As a result, the boron suboxide powder may advantageously be sintered without requiring any milling.

While the foregoing is directed to embodiments of the present invention, other and further embodiments of the invention may be devised without departing from the basic scope thereof.

The invention claimed is:

1. A method of preparing a boron suboxide powder, comprising:
   loading elemental boron powder into a furnace;
   purging the furnace by flowing a gas selected from the group consisting of nitrogen, other inert gases and mixtures thereof into the furnace;
   flowing a mixture of water vapor and argon, nitrogen, other inert gas, or a mixture thereof that is produced by bubbling the argon, nitrogen, other inert gas, or a mixture thereof through water to provide a reactive atmosphere;
   heating the elemental boron powder in the reactive atmosphere comprising a mixture of water vapor and argon, nitrogen, other inert gas, or a mixture thereof to convert the elemental boron powder into boron suboxide powder; and
   removing the boron suboxide powder from the furnace
   wherein oxygen that is used to convert the elemental boron powder into boron suboxide powder is supplied from oxygen that is in the mixture of water vapor and argon, nitrogen, other inert gas, or a mixture thereof that is the product of bubbling the argon, nitrogen, other inert gas, or a mixture thereof gas through water.

2. The method of claim 1, wherein the purity of the elemental boron powder is at least 92%.

3. The method of claim 1, wherein the purity of the elemental boron powder is at least 95%.

4. The method of claim 1, wherein the purity of the elemental boron powder is in the range of from about 92% to about 95%.

5. The method of claim 1, wherein the elemental boron powder comprises at least one of crystalline boron and amorphous boron.

6. The method of claim 1, wherein purging the furnace by flowing nitrogen further comprises purging the nitrogen from the furnace by flowing an inert gas into the furnace.

7. The method of claim 1, further comprising:
   washing the suboxide boron powder in deionized water and filtering the boron suboxide powder to remove at least one of a boron oxide ($B_2O_3$) or a boron hydroxide formed on the surface of the boron suboxide powder.

8. The method of claim 1, wherein heating the elemental boron powder further comprises heating the furnace to a temperature of from about 1200° C. to about 1500° C. for up to about 5 hours.

9. The method of claim 1, wherein the particle size of the boron suboxide powder removed from the furnace is equal to the particle size of the elemental boron powder loaded into the furnace.

10. The method of claim 1, further comprising sintering the removed boron suboxide powder without milling the boron suboxide powder.

11. The method of claim 1, further comprising heating the elemental boron powder at a pressure within the furnace of about atmospheric pressure.

12. The method of claim 1, wherein amount of oxygen in the reactive atmosphere converts about 50% to about 80% of the elemental boron powder into boron suboxide powder and about 50% to about 20% of the elemental boron powder into at least one of boron trioxide or boric acid.

13. The method of claim 1, further comprising agitating the elemental boron powder within the furnace.

14. A method of preparing a boron suboxide powder, comprising:
loading elemental boron powder into a furnace;
purging the furnace by flowing nitrogen, an inert gas, or a mixture thereof into the furnace;
flowing a mixture of argon and water vapor that is produced by bubbling argon through water;
heating the elemental boron powder to a temperature of from about 1200° C. to about 1500° C. and at a pressure of about atmospheric pressure in an atmosphere comprising a mixture of argon and water vapor to convert elemental boron powder into boron suboxide powder;
agitating the elemental boron powder within the furnace; and
removing the boron suboxide powder from the furnace
wherein oxygen that is used to convert the elemental boron powder into boron suboxide powder is supplied from oxygen that is in the argon and water vapor mixture that is the product of bubbling the inert gas through water.

15. The method of claim 14, further comprising washing the boron suboxide powder in deionized water and filtering the boron suboxide powder to remove at least one of a boron oxide ($B_2O_3$) or a boron hydroxide formed on the surface of the boron suboxide powder.

16. A method of preparing a boron suboxide powder, comprising the steps of:
loading elemental boron powder into a furnace;
purging the furnace by flowing a gas selected from the group consisting of nitrogen, other inert gases and mixtures thereof into the furnace;
flowing an argon and water vapor that is supplied by bubbling an argon gas through water to form an argon and water vapor mixture;
heating the elemental boron powder in the atmosphere comprising the argon and water vapor mixture;
converting the elemental boron powder into boron suboxide powder; and
removing the boron suboxide powder from the furnace;
wherein oxygen that is used to convert the elemental boron powder into boron suboxide powder is supplied from oxygen that is in the argon and water vapor mixture.

17. The method of claim 1, wherein the reactive atmosphere comprises a mixture of argon and oxygen gas and the amount of oxygen in the reactive atmosphere is no greater than about 1%.

18. The method of claim 14, wherein the reactive atmosphere comprises a mixture of argon and oxygen gas and the amount of oxygen in the reactive atmosphere is no greater than about 1%.

19. The method of claim 16, wherein the reactive atmosphere comprises a mixture of argon and oxygen gas and the amount of oxygen in the reactive atmosphere is no greater than about 1%.

20. A method of preparing a boron suboxide powder, comprising:
loading elemental boron powder into a furnace;
purging the furnace by flowing a gas selected from the group consisting of nitrogen, other inert gases and mixtures thereof into the furnace;
flowing a mixture of nitrogen, an inert gas, or a mixture thereof and water vapor that is produced by bubbling nitrogen, an inert gas, or a mixture thereof through water to provide a reactive atmosphere;
heating the elemental boron powder in the reactive atmosphere comprising a mixture of an argon and water vapor to convert the elemental boron powder into boron suboxide powder; and
removing the boron suboxide powder from the furnace
wherein oxygen that is used to convert the elemental boron powder into boron suboxide powder is supplied from oxygen that is in the nitrogen, an inert gas, or a mixture thereof and water vapor mixture that is the product of bubbling the nitrogen, an inert gas, or a mixture thereof through water.

\* \* \* \* \*